United States Patent [19]
Wright et al.

[11] Patent Number: 5,932,257
[45] Date of Patent: Aug. 3, 1999

[54] METHOD FOR ENRICHING DOCOSAHEXAENOIC ACID IN EXPRESSED MILK OF DAIRY CATTLE

[75] Inventors: Thomas C. Wright; Brian McBride; Bruce J. Holub, all of Ontario, Canada

[73] Assignee: University of Guelph, Guelph, Canada

[21] Appl. No.: 08/879,774

[22] Filed: Jun. 20, 1997

Related U.S. Application Data

[60] Provisional application No. 60/020,221, Jun. 21, 1996.

[51] Int. Cl.⁶ .............................. A23C 9/00; A23C 11/00; A23C 17/00
[52] U.S. Cl. .............................. 426/2; 426/580; 426/635; 426/643; 426/646; 924/807; 514/560; 424/438
[58] Field of Search .............................. 426/2, 635, 643, 426/646, 807, 580; 514/560; 424/438

[56] References Cited

U.S. PATENT DOCUMENTS

| | | | |
|---|---|---|---|
| 4,670,285 | 6/1987 | Clandinin et al. | 426/602 |
| 4,911,944 | 3/1990 | Holub | 426/635 |
| 4,960,795 | 10/1990 | Salte et al. | 514/560 |
| 5,012,761 | 5/1991 | Oh | 119/6.8 |
| 5,069,903 | 12/1991 | Stit | 424/195.1 |
| 5,106,639 | 4/1992 | Lee et al. | 426/302 |
| 5,133,963 | 7/1992 | Ise | 424/94.61 |
| 5,145,695 | 9/1992 | Smith et al. | 426/2 |
| 5,290,573 | 3/1994 | Holub | 426/2 |
| 5,340,594 | 8/1994 | Barclay | 426/49 |
| 5,374,657 | 12/1994 | Kyle | 514/547 |
| 5,397,591 | 3/1995 | Kyle et al. | 426/602 |
| 5,407,957 | 4/1995 | Kyle et al. | 514/547 |

FOREIGN PATENT DOCUMENTS

| | | |
|---|---|---|
| 0 404 058 | 12/1990 | European Pat. Off. . |
| 30 16 214 | 4/1980 | Germany . |
| 38 08 885 | 9/1989 | Germany . |
| 43 27 310 | 8/1993 | Germany . |
| 4-3411 | 1/1992 | Japan . |
| 4-27154 | 9/1992 | Japan . |
| 97-102696 | 3/1995 | Japan . |
| 8-275734 | 10/1996 | Japan . |
| 96-275734 | 10/1996 | Japan . |
| 83-36360 | 12/1996 | Japan . |
| 96-33630 | 12/1996 | Japan . |
| 93-11396 | 6/1993 | Rep. of Korea . |
| WO 89/08990 | 10/1989 | WIPO . |
| WO 92/12711 | 8/1992 | WIPO . |

OTHER PUBLICATIONS

Z.R. Zhu, et al., "Fatty Acid Composition of Breast Adipose Tissue in Breast Cancer Patients and in Patients With Benign Breast Disease", *Nutrition and Cancer*, pp. 151–160, 1995.

Dorothea F. Hebeisen, et al., "Increased Concentrations of Omega–3 Fatty Acids in Milk and Platelet Rich Plasma of Grass–Fed Cows", *International Journal for Vitamin and Nutrition Research* vol. 63, No. 3, pp. 229–233, 1993.

Salvatore Pepe, et al., "Dietary Fish Oil Confers Direct Antiarrhythmic Properties on the Myocardium of Rats", *The Journal of Nutrition: Biochemical and Molecular Roles of Nutrients*, vol. 126, No. 1, pp. 34–42, Jan. 1996.

Laura J. Stevens, et al., "Essential fatty acid metabolism in boys with attention–deficit hyperactivity disorder", *American Journal of Clinical Nutrition*, vol. 62, pp. 761–768, 1995.

Joel A. Simon, et al., "Serum Fatty Acids and the Risk of Coronary Heart Disease", *American Journal of Epidemiology*, vol. 142, No. 5, pp. 469–476, 1995.

G.C. Leng, et al., "Plasma Essential Fatty Acids, Cigarette Smoking, and Dietary Antioxidants in Peripheral Arterial Disease: A Population–Based Case–Control Study", *Arteriosclerosis and Thrombosis*, vol. 14, No. 3, pp. 471–478, Mar. 1994.

Maria Makrides, et al., "Are long–chain polyunsaturated fatty acids essential nutrients in infancy?", *The Lancet*, vol. 345, pp. 1463–1468, 1995.

A. Lucas, "Breast milk and subsequent intelligence quotient in children born preterm", *The Lancet*, vol. 339; pp. 261–264, Feb. 1992.

Akie Yonekubo, et al., "Dietary Fish Oil Alters Rat Milk Composition and Liver and Brain Fatty Acid Composition of Fetal and Neonatal Rats", *Journal of Nutrition*, vol. 123, No. 10, pp. 1703–1708, Oct. 1993.

Robin A. Henderson, et al., "Effect of Fish Oil on the Fatty Acid Composition of Human Milk and Maternal and Infant Erythrocytes", *Lipids*, vol. 27, No. 11, pp. 863–869, 1992.

Joseph R. Hibbeln, et al., "Dietary polysunsatured fatty acids and depression: when cholesterol does not satisfy", *American Journal of Clinical Nutrition*, vol. 62, pp. 1–9, 1995.

Edward A. Emken, et al., "Dietary linoleic acid influences desaturation and acylation of deuterium–labeled linoleic and linolenic acids in young adult males", *Biochimica et Biophysica Acta*, vol. 1213, No. 3, pp. 277–288, 1994.

Norman Salem, Jr., et al., "Arachidonic and docosahexaenoic acids are biosynthesized from their 18–carbon precursors in human infants", *Proc. Nat'l Acad. Sci. USA*, vol. 93, pp. 49–54, Jan. 1996.

Z.–Y. Chen, et al., "Trans Fatty Acid Isomers in Canadian Human Milk", *Lipids*, vol. 30, No. 1, 1995.

Maria Makrides, et al., "Changes in the polyunsaturated fatty acids of breast milk from mothers of full–term infants over 30 wk of lactation[1–3]", *American Journal of Clinical Nutrition*, vol. 61, pp. 1231–1233, 1995.

(List continued on next page.)

*Primary Examiner*—Nina Bhat
*Attorney, Agent, or Firm*—Foley & Lardner

[57] ABSTRACT

A feed additive for dairy cattle is described comprising DHA and inhibitors of microbial degradation of DHA in the rumen of the dairy cattle. A method of producing milk in dairy cattle which is enriched for DHA is also described comprising feeding the dairy cattle a feed containing the feed additive of the invention for a period of at least about 14 day, and milking the dairy cattle to obtain milk enriched for DHA.

12 Claims, No Drawings

OTHER PUBLICATIONS

William S. Harris, et al., "Will dietary ω–3 fatty acids change the composition of human milk?[1-3]", *The American Journal of Clinical Nutrition,* vol. 40, pp. 780–785, Oct. 1984.

Joyce A. Nettleton, "Are n–fatty acids essential nutrients for fetal and infant development?", *Journal of the American Dietetic Association,* vol. 93, No. 1, Jan. 1993.

O. Taugbol, et al., "Supplements of Cod Liver Oil to Lactating Sows, Influence on Milk Fatty Acids Composition and Growth Performance of Piglets", *Journal of Veterinary Medicine,* vol. 40, pp. 437–443, 1993.

Mäntysaari et al. Performance of Cows in Early Lactation Fed Isonitrogenous Diets Containing Soybean Meal or Animal By–Product Meals, J. Dairy Sci., vol. 72, No. 11, pp. 2958–67 (1989).

J. Kammerlehner Deutsche Milchwirtschaft, vol. 45, No. 2, pp. 68–7 (1995).

METHOD FOR ENRICHING DOCOSAHEXAENOIC ACID IN EXPRESSED MILK OF DAIRY CATTLE

This application claims benefit under Title 35 United States Code 119(e) of Provisional Application 60/020,221, filed Jun. 21, 1996.

FIELD OF THE INVENTION

The present invention relates to the field of animal husbandry, in particular, to a feed additive, and a method for enriching docosahexaenoic acid in expressed milk of dairy cattle.

BACKGROUND OF THE INVENTION

The omega-3 (or n-3) polyunsaturated fatty acid known as docosahexaenoic acid (DHA) is found in abundance in the brain and retina. DHA has been found to be required at high levels in the brain and retina for optimal mental functioning (learning ability, etc.) and visual acuity (visual performance), respectively. Therefore, dietary DHA is regarded as an essential dietary nutrient for infants (both preterm and term) and children on mixed diets ((British Nutrition Foundation: Unsaturated fatty acids: Nutritional and Physiological Significance. Andover, England: Chapman and Hall, 1992, and British Nutrition Foundation; Recommendations for Intakes of Unsaturated Fatty Acids, 1992).

Studies have shown significant alleviation of various risk factors for cardiovascular disease (CVD) when fish and fish oils containing the omega-3 polyunsaturated fatty acids DHA and eicosapentaenoic acid (EPA) are consumed. Epidemiological studies have also shown an inverse relationship between DHA levels in the population (diet/blood) and the risk of CVD (Leng, G. C. et al., Arterioscler. Thromb. 1994; 14:471–478, Simon, J. A., et al. Am. J. Epidemiol. 1995; 142:469476). Therefore, part of the cardioprotective effect of fish/fish oils containing omega-3 polyunsaturated fatty acids is due to DHA, in addition to EPA. The cardioprotective effects of omega-3 fatty acids are considered to be mediated by a number of physiological/biochemical mechanisms. Studies have shown that the enrichment of heart tissue in DHA provides an antiarrhythmic effect (Pepe, S. and McLennan, P. L. J. Nutr. 1996; 126:34–42) which may account for the reductions in cardiac arrest and sudden cardiac death in those having a higher DHA status (in diet/body). In addition, dietary DHA intakes and increased status in the body have been implicated in favourable effects on attention-deficit disorders (Stevcns, L. J. et al Am. J. Clin. Nutr. 1995; 62:761–768), depression and anxiety disorders (Hibbeln, J. R. and Salem, N. Am. J. Clin. Nutr. 1995; 62:1–9.), as well as protection against breast cancer in postmenopausal women (Zhu, Z. R., et al., Nutr. Cancer. 1995; 24:151–160).

DHA is found In abundance in fish and fish oils (with very minor amounts in eggs and some meats), but it is absent from all plant-derived food products including vegetable oils. Certain plant oils (eg., soybean oil) contain moderate amounts of another omega-3 fatty acid, alpha-linolenic acid (LNA), which can, to an extremely limited extent (Emken, E. A., et al. BBA. 1994; 1213:277–288 and Salem, N., et al., Proc. Natl. Acad. Sci. 1996; 93;49–54.) be metabolically converted in the body to provide sub-optimal amounts of DHA.

Mothers' breast milk in North America and elsewhere typically contains approx. 0.14 to 0.2% by wt. of the fat/fatty acids as DHA (Chen, Z.-Y., et al., Lipids. 1995; 30:15–21 and Makrides, M., et al., Am. J. Clin. Nutr. 1995; 61:1231–1233). Infants on breast milk (a source of DHA) perform better in visual acuity testing than those on formulae typically used in North America lacking DHA (Nettleton, J. A. J. Am. Diet Assoc. 1993; 93:58–64 and Makrides, M., et al., Lancet. 1995; 345:1463–68). Intelligence scores were also found to be higher in children receiving breast milk containing DHA when young (Lucas, A., et al., Lancet. 1992; 339:261–264). DHA has been added to selected infant formula products in Japan and recently in Europe to provide a direct dietary source of DHA in infant formula thereby providing optimal DHA levels and its associated benefits to infants. (JP 043411; WO 9212711; EP 404058; U.S. Pat. No. 4,670,285). Unfortunately, cow's milk is devoid of DHA and has only very modest amounts of LNA. Consequently, the recommended dietary levels of DHA for children on mixed diets (see recommendations of the British Nutrition Foundation; Recommendations for Intakes of Unsaturated Fatty Acids, 1992) cannot be fulfilled with cow's milk and associated dairy products (cheeses, ice-creams, etc.). This is particularly important at a development stage where there is active learning, information processing, and intellectual development.

Efforts have been made to increase dietary intake of DHA by adding or incorporating DHA into various foods. Methods have been developed to increase the level of omega-3 fatty acids in the flesh of beef cattle (U.S. Pat. No. 5,290,573), sows (U.S. Pat. No. 5,106,639; DE 3808885; Taugbol, O. et al., *Zentralbl. Veterinarmed. A.*, 40(6): 437–443, 1993), poultry (U.S. Pat. No. 5,012,761; JP 04271754; U.S. Pat. No. 5,133,963; U.S. Pat. No. 5,069,903), and eggs (KR 9311396; U.S. Pat. No. 5,069,903). DHA has also been added as a dietary supplement to infant formula as discussed above, and milk. Sources of DHA for supplementing milk or infant formula include fish products, fatty acid containing microbial oils (U.S. Pat. No. 5,374,657; U.S. Pat. No. 5,397,591; U.S. Pat. No. 5,407,957), or fatty acids extracted from a mixture of egg yolk and coconut oil (U.S. Pat. No. 4,670,285).

Researchers have been able to increase DHA content in the expressed milk of humans (Harris, W. S. et al., *Am. J. Clin. Nuir.* 40(4): 780–785, 1984; Henderson, R. A., *Lipids*, 27(11): 863–869, 1992; U.S. Pat. No. 5,069,903), sows (Taugbol, ) O. et al., *Zentralbi, Veterinarmed. A.* 40(6): 437–443, 1993), and rats (Yonekubo, A., et al. *J. Nutr.* 123(10): 1703–1708, 1993). However, researchers have had difficulty obtaining significant levels of DHA in cow's milk. (Hebeisen, D. F., et al. *Int. J. Vitam. Nutr. Res.*, 63(3): 229–233, 1993).

SUMMARY OF THE INVENTION

The present inventors have found that DHA (docosahexaenoic acid) is express in the milk of dairy cattle fed a novel feed additive containing DHA, and inhibitors of microbial degradation of DHA in the rumen of the cattle. The feed additive does not affect the ability of the cattle to digest the feed by normal symbiotic digestion. The feed additive is also palatable to the cattle, and therefore food consumption is not decreased. As a result, the health of the cattle is maintained and their productivity is not reduced.

The present inventors found that when the dairy cattle are fed the feed additive throughout lactation, the levels of DHA in the expressed milk are between 0.2% and 0.5% of the long chain fatty acids in the milk. These DHA levels are as high as, or exceed the World Health Organization recommended levels of DHA in milk (0.2 to 0.3%). A feed additive containing only fishmeal with DHA resulted in amounts of DHA far below the levels obtained with the novel feed additive.

Broadly stated, the invention relates to a feed additive for dairy cattle comprising DHA and inhibitors of microbial degradation of DHA in the rumen of the dairy cattle. In an embodiment of the invention, the feed additive comprises feathermeal, bloodmeal, and fishmeal containing DHA. The invention also contemplates a feed containing the feed additive.

The invention also relates to a method of producing milk in dairy cattle which is enriched for DHA comprising feeding the dairy cattle a diet containing the feed additive of the invention for a period of at least about 14 days, and milking the dairy cattle to obtain milk enriched for DHA.

The invention further relates to expressed milk from dairy cattle enriched for DHA which is produced by feeding the cattle a diet containing a feed additive of the invention for a period of at least about 14 days, and milking the dairy cattle to obtain milk enriched for DHA.

Other objects, features and advantages of the present invention will become apparent from the following detailed description. It should be understood, however, that the detailed description and the specific examples while indicating preferred embodiments of the invention are given by way of illustration only, since various changes and modifications within the spirit and scope of the invention will become apparent to those skilled in the art from this detailed description.

DETAILED DESCRIPTION OF THE PREFERRED EMBODIMENT

As hereinbefore mentioned, the present invention relates to a feed additive for dairy cattle comprising DHA, and inhibitors of microbial degradation of DHA in the rumen of dairy cattle.

The DHA which is in the feed additive may be a DHA concentrate which may contain 5 to 98% DHA, or it may be a component of an extract from a source known to contain DHA; for example, it may be a component of an extract derived from fish, such as fishmeal. DHA concentrates may be obtained from commercial sources for example, from Life Plus International, Inc. (Batesville, Ark.), Norsk Hydro As, and Nippon Oils and Fats KK.

In an embodiment of the invention, the feed additive comprises feathermeal bloodmeal, and fishmeal containing DHA. The fishmeal may be made from mackeral, caplin, talapia, manhaden, or herring, preferably herring, and contains an amount of DHA which will provide about 5 to 12% DHA by weight of the total fatty acids in the feed as described herein. Fishmeal may be selected which has 76.7% protein and total fat content of 8.2% (dry measurement basis). The feathermeal may be made from the feathers of broiler chickens, and the bloodmeal may be made from bovine or porcine blood. Feathenmeal may be selected which has 93.9% protein, and a total fat content of 2.6% (dry measurement basis); bloodmeal may be selected which has 87.7% protein, and a total fat content of 1.8% (dry measurement basis). It will be appreciated that the fishmeal, feathermeal and bloodmeal may be obtained from commercial sources for example, Ralston Purina, Shurgain, Masterfeeds, ADM & Purina Mills.

In a preferred embodiment, the feed additive contains 10 to 35% feathermeal, preferably 20 to 25% by weight of the total feed additive; 1 to 20% bloodmeal, preferably 8 to 10% by weight of the total feed additive; and 30 to 55% fishmeal, preferably 40 to 45% by weight of the total feed additive.

The feed additive may contain a carbohydrate fraction such as soft white wheat or corn. Preferably the feed additive contains soft white wheat.

The feed additive may be added to a basal feed which may contain a carbohydrate fraction, a protein fraction, and a vitamin/mineral fraction. Examples of components in carbohydrate fractions include corn silage, alfalfa hay, Timothy hay, wheat straw, barley grain, canola meal, oat grain, mixed straw, and corn. Typical components in the vitamin/mineral fraction include magnesium oxide, limestone, potassium chloride, sodium chloride, and a trace mineral supplement, containing zinc, copper, manganese, selenium, vitamins A, D and E. Commercial sources of these components are Ralston Purina, Shurgain, Masterfeelds, ADM & Purina Mills. Typical protein feeds include soybean meal, corn gluten meal, distillers dried grains, and meat meal.

The feed containing the feed additive may be pelleted for feeding to dairy cattle, or the feed additive and basal feed may be fed to the cattle in a total mixed ration or as separate ingredients.

In an embodiment of the invention a feed is provided comprising (a) a basal feed contaning 2 to 10%, preferably 5–7%, mixed straw; 40 to 55%, preferably 45 to 47% corn silage; 35 to 50%, preferably 42 to 45% high moisture corn, and 2–4% of a vitamin/mineral fraction, each percentage being a percentage of the total weight of the basal feed; and (b) a feed additive comprising 0.5 to 5% feathermeal, 0.2 to 2% bloodmeal, and 1 to 8% herring meal, each percentage being a percentage of the total weight of the feed. In a preferred embodiment of the invention, the feed additive comprises 4%, feathermeal; 2% bloodmeal, and 8% herring meal, each percentage being a percentage of the total weight of the feed.

The invention also relates to a method of producing milk in dairy cattle which is enriched for DHA comprising feeding the dairy cattle a diet containing the feed additive of the invention for a period of at least about 14 days, and milking the dairy cattle to obtain milk enriched for DHA. The cattle may be fed a basal feed containing the feed additive, or the feed additive and basal feed may be fed to the cattle in a total mixed ration or as separate ingredients.

The cattle are preferably fed throughout lactation, and for at least 14 days, preferably 17 days, in order to obtain expressed milk with a DHA content which is greater than 0.2% of long chain fatty acids in the milk. Typically the cattle are fed the feed additive (which may be part of a basal feed) twice daily. The amount of feed additive given to the cattle ranges from 600 grams to 7.5 kg per animal per day.

The method of the invention for producing expressed milk enriched for DHA may be applied to any breed of dairy cattle, for example, Ayshire, Guernsey, Holstein, Jersey, Brown Swiss, Dutch Belted, Canadienne and Milking Shorthorn. It will be appreciated that the method may also be applied to other ruminant species such as sheep and goats to produce expressed milk enriched for DHA.

The expressed milk from dairy cattle enriched for DHA produced by a method of the invention contains levels of DHA typically in the range of 0.15 to 0.55% of long chain fatty acids in the milk. These levels are as high as, or higher than found in human expressed milk. The DHA content of expressed milk obtained using the method of the invention meets or exceeds the World Health Organization recommended levels of DHA in milk (0.2 to 0.3%). The taste of the milk enriched for DHA produced by the method of the invention is not altered and it is therefore suitable for human consumption.

It will be appreciated that other DHA-enriched dairy products can be produced by using the method described herein. For example, cheese, yogurt, cream, ice-creams, powdered milk, evaporated milk, infant formula, and butter enriched for DHA may be produced using DHA-enriched expressed milk prepared by the method of the invention.

The milk and diary products of the present invention enriched for DHA are nutritionally superior products to conventional milk products. The milk and diary products may be of particular benefit with respect to the various factors for brain development, visual acuity, and cardiovascular disease. The benefits of the invention also extend beyond the production of DHA-enriched food products for human consumption. For example, dairy cattle that are fed with a feed of the invention can be expected to exhibit improved health effects associated with omega-3 fatty acids since DHA is an essential nutrient for growth, development, and neuronal functioning in the animals.

The following non-limiting examples are illustrative of the present invention:

EXAMPLES

Example I
DHA Production with Three Different Levels of Supplement

Six multiparous Holstein dairy cows post-peak lactation were assigned at random to a Latin square design, with a 3×2 factorial arrangement of treatment. The Latin square was balanced for residual effects. The treatments were: Three dietary levels of a custom rumen-undegradable protein supplement, and two different feed intake levels of a custom rumen protein basal ration. The length of each of the six periods was 21 days. Each 21 day period was divided into three phases: (1) 7 days for treatment adaptation and ad libitum intake, (2)14 days for restricted or ad libitum feed intake (depending on treatment), and (3) the final five days of phase (2) were used for data collection, when relevant measures were recorded.

The cows were fed twice daily in equal amounts at approximately 0600 and 1400 hours. The milking was done twice daily at 0500 and 1600 hours. Individual milk samples were taken from both the morning and afternoon milking, and later pooled based on production, to obtain a representative daily sample from each cow.

Tables 1 and 2 show the composition of the basal ration and the custom feed supplement respectively. The protein supplement was added to the basal ration at three levels of total intake (as fed basis): Low 2.5%, Medium 8.8%, and High 18.5%, to obtain the three levels of protein supplementation. Table 3 shows the amount of Peathermeal, Bloodmeal, and Herring Meal in the three supplement levels, as a percent of feed.

TABLE 1

Low Crude Protein Ration

| Ingredient | % of Ration DM Basis |
| --- | --- |
| Mixed Straw | 6.3 |
| Corn Silage | 46.0 |
| High Moisture Corn | 44.3 |
| Mineral and Vitamin Mix | 3.1 |

TABLE 2

Ingredients in Protein Supplement

| Component | Percent of Supplement (As Fed) |
| --- | --- |
| Soft White Wheat | 25 |
| Feathermeal | 22.8 |
| Bloodmeal | 9.5 |
| Herring Meal | 42.7 |

TABLE 3

Ingredients in Protein Supplement as a Percent of Feed.

| Supplement Level | Percent of Feathermeal In Feed | Percent of Bloodmeal In Feed | Percent of Herring Meal In Feed |
| --- | --- | --- | --- |
| LOW | 0.63 | 0.24 | 1.07 |
| MEDIUM | 2.01 | 0.84 | 3.76 |
| HIGH | 4.16 | 1.76 | 7.90 |

No ill effects were observed in animals consuming the feed supplement. Table 4 shows the DHA content (% long chain fatty acids in the milk) in expressed milk two weeks after the cows first started consuming the feed. Milk production and feed consumption were similar to production/consumption observed when the cows were fed conventional feeds.

An omega-3 fatty acid analysis was carried out on the feed containing the protein supplement DHA, EPA, DHA+EPA, and total omega-3 in the feed were 6.5, 4.3, 10.8, and 12.9%, respectively, of total fatty acids in the feed.

TABLE 4

Effects of Custom feed supplement on DHA levels in milk.

| Supplement Level | DHA (ls mean; % of long chain fatty acids) | Standard Error | Main Effect P-Value |
| --- | --- | --- | --- |
| LOW | 0.15 | 0.02 | 0.0001 |
| MEDIUM | 0.28 | 0.02 | 0.0001 |
| HIGH | 0.35 | 0.02 | 0.0001 |

Example II
Fishmeal Supplement Alone

Pelleted fishmeal was fed to 5 Holstein cows for three weeks. An identical ration, but without fishmeal, was fed to 5 control cows for comparison purposes.

Milk samples were taken for fatty acid analysis on day zero from all cows, when no fishmeal had been fed to either group. Milk samples were subsequently taken on day 21 from all cows when five had consumed fishmeal. Results were compared between groups for both days. Results for EPA and DHA are expressed on a percent fatty acid basis of all long chain fatty acids, and are shown in Table 5.

TABLE 5

Results of Fishmeal Experiment.

| % of long chain FA | Fishmeal | No Fishmeal | Significance |
| --- | --- | --- | --- |
| Day 0 | | | |
| EPA | 0.032 | 0.033 | NS |
| DHA | 0.020 | 0.020 | NS |
| Day 21 | | | |
| EPA | 0.041 | 0.032 | NS |
| DHA | 0.061 | 0.036 | 0.01 |

There was no significant difference between control and fishmeal groups for concentration of EPA, but there was a significant difference between the groups for DHA concentration in milk at day 21, The mean concentration of DHA from the fishmeal supplemented cows in this experiment is significantly less that the 0.15 level reported in Example I for the equivalent level of fishmeal supplementation.

Having illustrated and described the principles of the invention in a preferred embodiment, it should be appreciated to those skilled in the art that the invention can be modified in arrangement and detail without departure from such principles. We claim all modifications coming within the scope of the following claims.

All publications, patents and patent applications are herein incorporated by reference in their entirety to the same extent as if each individual publication, patent or patent application was specifically and individually indicated to be incorporated by reference in its entirety.

We claim:

1. Expressed milk from dairy cattle enriched for docosahexaenoic acid (DHA) which is produced by feeding the dairy cattle a feed containing a feed additive comprising:
   (a) a source of docosahexaenoic acid (DHA); and
   (b) inhibitors of microbial degradation of DHA in the rumen of the dairy cattle comprising feathermeal, said components being present in the feed in an amount sufficient to enhance the production of DHA in the milk of dairy cows fed with feed containing the additive, for a period of at least about 14 days, and milking the dairy cattle to obtain the milk.

2. Expressed milk from dairy cattle according to claim 1 wherein said source of docosahexaenoic acid (DIA) is fishmeal.

3. Expressed milk according to claim 1 which contains 0.2% to 0.5% docosahexaenoic acid (DHA) as a percent of the long chain fatty acids in the milk.

4. A docosahexaenoic acid (DHA)-enriched dairy product produced using expressed milk from dairy cattle enriched for docosahexaenoic acid (DHA) which is produced by feeding the dairy cattle a feed containing a feed additive comprising:
   (a) a source of docosahexaenoic acid (DHA); and
   (b) inhibitors of microbial degradation of DHA in the rumen of the dairy cattle comprising feathermeal, said components being present in the feed in an amount sufficient to enhance the production of DHA in the milk of dairy cows fed with feed containing the additive, for a period of at least about 14 days, and milking the dairy cattle to obtain the milk.

5. A docosahexaenoic acid (DHA)-enriched dairy product according to claim 4 wherein said source of docosahexaenoic acid (DHA) is fishmeal.

6. A docosahexaenoic acid (DRA)-enriched dairy product according to claim 4 which is cheese, yogurt, cream, ice-creams, powdered milk, evaporated milk, infant formula, or butter.

7. A feed additive for dairy cattle comprising:
   (a) a source of docosahexaenoic acid (DHA); and
   (b) inhibitors of microbial degradation of DHA in the rumen of the dairy cattle comprising feathermeal, said components being present in the feed in an amount sufficient to enhance the production of DHA in the milk of dairy cows fed with feed containing the additive over a period of time.

8. A feed additive for dairy cattle according to claim 7 wherein said source of docosahexaenoic acid (DHA) is fishmeal.

9. A feed containing the feed additive according to claim 7.

10. A feed additive for dairy cattle as claimed in claim 7 wherein the period of time is at: least about 14 days.

11. A method of producing milk in dairy cattle which is enriched for docosahexaenoic acid (DHA) comprising feeding the dairy cattle a feed containing a feed additive comprising a source of the docosahexaenoic acid (DHA) and inhibitors of microbial degradation of DHA in the rumen of the dairy cattle comprising feathermeal, said components being present in the feed in an amount sufficient to enhance the production of DHA in the milk of dairy cows fed with feed containing the additive, for a period of at least about 14 days, and milking the dairy cattle to obtain milk enriched for docosahexaenoic acid (DHA).

12. A method of producing milk according to claim 11 wherein the source of docosahexaenoic acid (DHA) is fishmeal.

* * * * *